US005658033A

United States Patent [19]
Delaune

[11] Patent Number: 5,658,033
[45] Date of Patent: Aug. 19, 1997

[54] APPARATUS FOR EXTENDING THE LOAD CARRYING BED AREA OF A TRUCK

[76] Inventor: Terry J. Delaune, 44424 Edna Delaune Rd., St. Amant, La. 70774

[21] Appl. No.: 571,083

[22] Filed: Dec. 12, 1995

[51] Int. Cl.⁶ ........................................... B60R 11/00
[52] U.S. Cl. ........................ 296/26; 296/57.1; 224/402; 224/521; 224/526
[58] Field of Search .................. 296/26, 50, 57.1, 296/58, 59, 60, 61; 224/402, 403, 404, 405, 519, 520, 521, 522, 523, 524, 525, 526, 527, 528, 529, 530

[56] References Cited

U.S. PATENT DOCUMENTS

| | | | |
|---|---|---|---|
| 2,872,239 | 2/1959 | Bowness et al. | 296/26 |
| 4,023,850 | 5/1977 | Tillery | 296/26 |
| 4,472,639 | 9/1984 | Bianchi | 296/26 |
| 4,596,417 | 6/1986 | Bennett | 296/61 |
| 4,778,213 | 10/1988 | Palmer | 296/26 |
| 4,932,703 | 6/1990 | Chamberlin et al. | 296/26 |
| 4,951,991 | 8/1990 | Haigler | 296/26 |
| 5,033,662 | 7/1991 | Godin | 296/57.1 X |
| 5,154,470 | 10/1992 | Bringman, Jr. | 296/26 |
| 5,451,088 | 9/1995 | Broad | 296/26 |
| 5,458,389 | 10/1995 | Young | 296/26 |

*Primary Examiner*—Andrew C. Pike
*Attorney, Agent, or Firm*—Pravel, Hewitt, Kimball & Krieger

[57] ABSTRACT

An apparatus for extending a pickup truck bed includes a removable frame that can be connected to the pickup truck bumper or its hitch receiver. The frame includes a longitudinal beam that extends away from the truck bed during use, forming a connection with the receiver. A transverse beam is structurally attached to the distal end of the longitudinal beam and extends about the width of the pickup truck bed. Left and right side wall extension members are mounted respectively on opposite sides of the transverse beams, each side wall extension member being rectangular and having front and rear vertical edges and a lower edge that conforms to the plane of the bed. The frame provides an open area that allows the pickup truck tailgate to be lowered to define an extension of the load carrying surface of the bed. An auxiliary tailgate is pivotally attached to the transverse beam and is movable between open and closed positions. In the closed position, the auxiliary tailgate and the left and right side wall extension members form an enclosure about the lowered tailgate and thus an overall enclosure about the rear end portion of any load being carried.

9 Claims, 3 Drawing Sheets

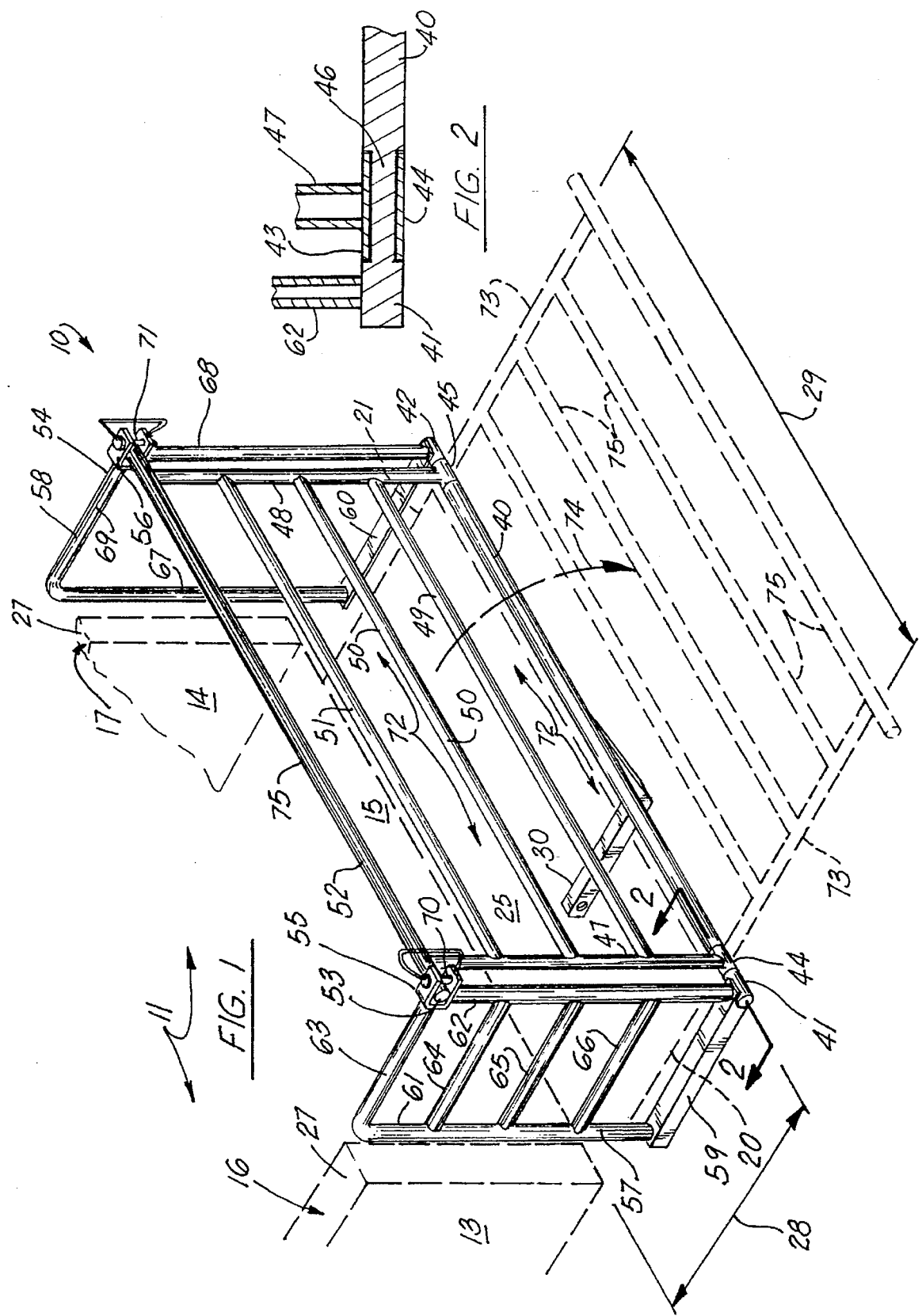

APPARATUS FOR EXTENDING THE LOAD CARRYING BED AREA OF A TRUCK

BACKGROUND OF THE INVENTION:

1. Field of the Invention

The present invention relates to vehicle truck bodies and more particularly to pickup truck bed constructions and extension therefor and more particularly to an improved extension apparatus for extending a pickup truck bed with a removable frame that attaches to a truck, a bumper, or a trail hitch receiver with a longitudinal beam that extends away from the frame and a transverse beam connected to the longitudinal beam, the transverse beam carrying side portions that align with the pickup truck bed side walls and a auxiliary tailgate mounted on the transverse beam in pivotal fashion to open and close the bed and extension. An open space is provided between the side walls of the frame, allowing the standard pickup tailgate to travel between open and closed positions, the open position defining a floor for the extension frame.

2. General Background

Pickup trucks typically have a flat rectangular bed, rectangular side walls, and a generally rectangular tailgate that moves in a pivotal fashion between open and closed positions. It is known in the art to use an extension member to carry articles externally of the pickup truck bed on a rectangular flat surface. Typically such extenders mount in the trail hitch receiver of the pickup truck. They usually comprise a welded frame cover with an expanded metal surface to which articles can be attached using elastic cords or rope for example.

One of the problems with such extenders is that they do not provide continuity with the rectangular flat bed floor. Further, extenders that are presently available do not provide protection for containing articles in the form of upstanding side walls.

A number of patents have issued that relate to the concept of providing an extension for a pickup truck bed.

SUMMARY OF THE INVENTION

The present invention solves these prior art problems and shortcomings by providing a trailer hitch-like apparatus for extending a pickup truck bed that includes bed side walls with upper edges, the upper edges defining an uppermost plane. The pickup truck bed typically also includes a horizontal bed between the bed walls that defines a lowermost plane. The pickup truck has a bumper and a pivoting tailgate that extends above the bumper and is movable between open and closed positions.

The present invention provides an improved extension apparatus comprising a frame that includes one or more structural members that removably attaches to the truck frame. This removable connection is typically at the receiver portion of the trailer hitch or that portion of the bumper to which a trailer hitch would be bolted.

The extension frame includes a longitudinally extending beam that extends away from the bumper and the truck bed. The longitudinal beam provides proximal and distal end portions. A removable connector is provided for securing the proximal end of the longitudinal beam to the truck frame at either the truck bumper or hitch receiver.

A transverse beam is attached to the distal end of longitudinal beam. The transverse beam extends about the width of the pickup truck bed. Left and right upstanding side wall extension portions are mounted respectively on opposite ends of the transverse beam.

Each side wall extension member is generally rectangular having front and rear vertical edges, a lower edge that conforms to the plane of the bed, and an upper edge that is adjacent the plane defined by the bed wall upper surfaces.

The side wall extension members and transverse beam surround an open area during use that is above the longitudinal beam. This open space enables the tailgate of the pickup truck to be raised or lowered. The tailgate can be lowered notwithstanding that the longitudinal beam is connected to the truck in operating position. With the present invention, the tailgate of the truck can be lowered into an open position, functioning as the "bed" and extending the bed length. The side wall extension members and auxiliary tailgate then define three additional wall portions that surround the lowered truck tailgate thereby completing and enclosure with the regular truck bed and its side walls. The effect of this construction is to increase the length of a truck bed from for example a six-foot or a six-and-half-foot bed to an eight-foot bed.

The auxiliary tailgate is preferably pivotally attached to the transverse beam and is movable between open and closed positions. In the closed position, the auxiliary tailgate is vertically oriented and engages each of the rear vertical edges of the side wall extension members. A pinned connection forms a closure at the upper end of the auxiliary tailgate for holding it in the closed position.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 1 is a perspective view of the preferred embodiment of the apparatus of the present invention;

FIG. 2 is a fragmentary sectional elevational view of the preferred embodiment of the apparatus of the present invention taken along line 2—2 of FIG. 1 illustrating the connection between one of the extension side walls and the auxiliary tailgate;

DETAILED DESCRIPTION OF THE PREFERRED EMBODIMENT

Figure 3:
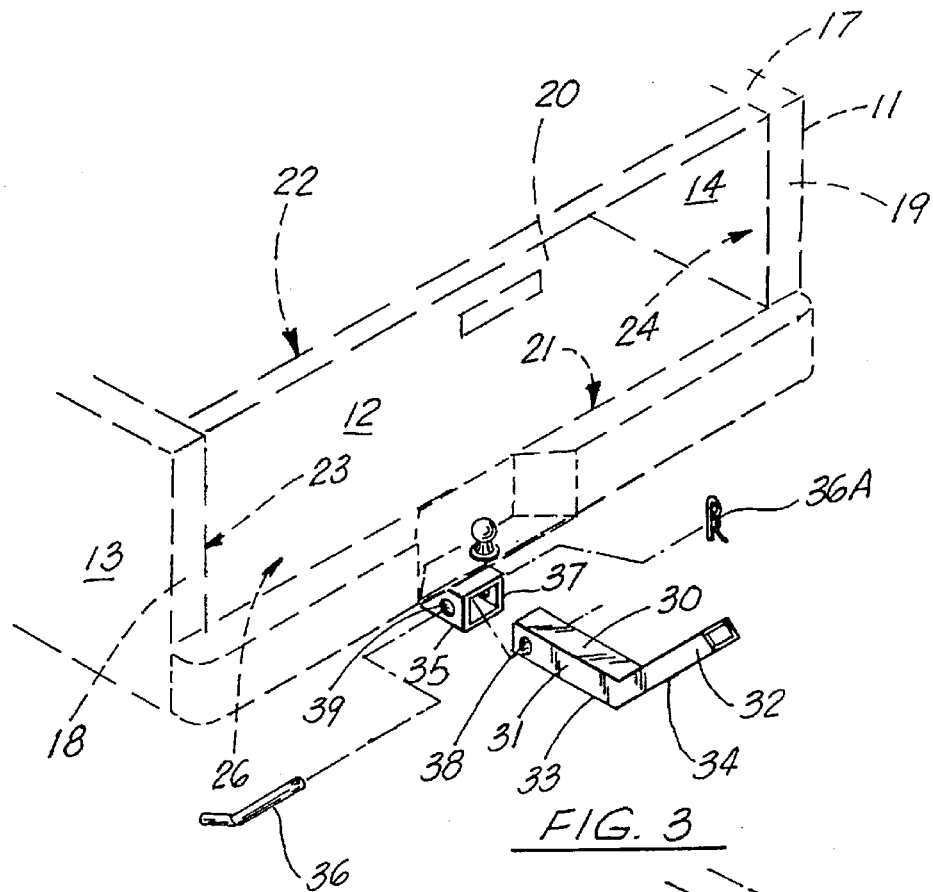
FIG. 3 is a fragmentary view of the preferred embodiment of the apparatus of the present invention illustrating connection to a truck hitch receiver.

FIG. 1 shows generally the preferred embodiment of the apparatus of the present invention designated generally by the numeral 10. Pickup truck bed extension apparatus 10 is shown in use mounted upon a conventional pickup truck 11. For purposes of illustration, the truck 11 is only partially shown, detailing on the bed area, a portion of the frame of the truck, and its bumper and receiver. The truck bed 12 is shown as being generally rectangular and flat. A pair rectangular side walls 13, 14 extend the length of the bed such as for example six and a half feet long. The bed 12 provides a rectangular flat load carrying surface 15. The upper surfaces 16, 17 of rectangular side walls 13, 14 define an uppermost plane 27. The plane of the bed is designated as 26.

The bed rectangular side walls 13, 14 terminate at rear vertical edge portions 18, 19. In this region, a tailgate 20 is typically pivotally attached to the truck. The tailgate 20 includes a lower edge 21, an upper edge 22, and side edges 23, 24. When the tailgate 20 is moved to the lower, open position it presents a flat surface 25 that falls in the plane 26 of bed 12. In this position, the rectangular flat bed 15 is extended approximately one and a half feet so that longer items can be contained within the bed, such as for example eight-foot long pieces of timber, wheeled vehicles, (motorcycles, off-road carts, etc). In FIG. 1, 28 indicates the extended dimension that flat load carrying surface 15 is extended when tailgate 20 is in the lowered, open position. The dimension 29 indicates the width of the bed.

The present invention provides an extension that can be used with pickup truck 11 notwithstanding that the tailgate 20 has been placed in the lowered, opened position of FIG. 1. In FIG. 2, the apparatus 10 includes a longitudinal beam 30 that can be bent as shown in FIG. 1 to provide a horizontal section and an inclined section. The beam 30 includes a proximal end 31 and distal end 32. The horizontal and inclined sections are designated as 33, 34 respectively.

Beam 30 is preferably square or rectangular in cross section and fits within the correspondingly shaped socket 35 of a common receiver type trailer hitch. Further, a locking pin 36 can be used to form a structural connection between longitudinal beam 30 and receiver 37 at socket 35. Such pins 36 are commercially available, typically being provided with a retainer clip 36A that prevents removal. The pin 36 is placed through openings 38 in longitudinal beam 30 and similarly shaped openings 39 in receiver 37.

Transverse beam 40 is structurally attached to the distal end 32 of longitudinal beam 30 by welding for example. Transverse beam 40 extends laterally about the dimension 29 of the bed width.

Transverse beam 40 includes a left end portion 41 and a right end portion 42. These end portions 41, 42 support left and right side walls 57, 58 which are connected thereto by welding for example. The longitudinal beam 30, the transverse beam 40, and the sidewall extension members 57, 58 are of a welded metallic construction. Bushings 44, 45 each fits over a reduced diameter section 46 of beam 40. The bushings 44 provide an outer surface 43 that is of the same generally outer configuration as that of the remainder of beam 40 as shown in FIGS. 1 and 2. Each bushing 44, 45 has a vertical beam 47, 48 attached thereto. Horizontal members 49–52 span between vertical beams 47, 48 to define an auxiliary tailgate that can be raised and lowered. The member 52 has locking end portions 53, 54 that fit into C-shaped receptacles 55, 56 as shown in FIG. 1 when the auxiliary tailgate 75 is in the upper position as shown in hard lines in FIG. 1.

The left and right side walls 57, 58 respectively include longitudinal beams 59, 60. Wall 57 includes post members 61, 62, and a plurality of longitudinally extending members 63–66. Likewise, the right hand side wall 58 includes vertical posts 67, 68, horizonal member 69, longitudinal beam 60, and a plurality of longitudinal members similarly configured as side wall 57 but not shown in FIG. 1 for purposes of clarity.

Locking pins 70, 71 are used to hold the auxiliary tailgate 75 in the uppermost position.

The beam 30 supports transverse beam 40 and side walls 57, 58 in such a position that an open space 72 is provided in between the longitudinal beams 59, 60 and in between the truck bed 12 and transverse beam 40. This open space 72 is also above the horizonal portion 33 of beam 30. This configuration allows the truck tailgate 20 to be lowered completely into an opened position. When the tailgate 20 is lowered as shown in FIG. 1, the side walls 57, 58 and the auxiliary tailgate 75 form a three sided enclosure about the tailgate 20. The combination of the bed 12 and open tailgate 20 as shown in FIG. 1 defines an extension for the truck bed in a single plane 25, 26. With the present invention, the side walls 57, 58 and the auxiliary tailgate 75 do not interfere with complete operation of the truck tailgate 20 notwithstanding that it has been raised or lowered. In the lowered position 73 of FIG. 1, the auxiliary tailgate 75 can be lowered completely out of the way so that articles to be added to the bed 12 can easily pass in between the side walls 57, 58. Arrow 74 in FIG. 1 indicates a downward movement of the auxiliary tailgate 75 to the position shown as 73 in the drawings in phantom lines.

Figure 4:
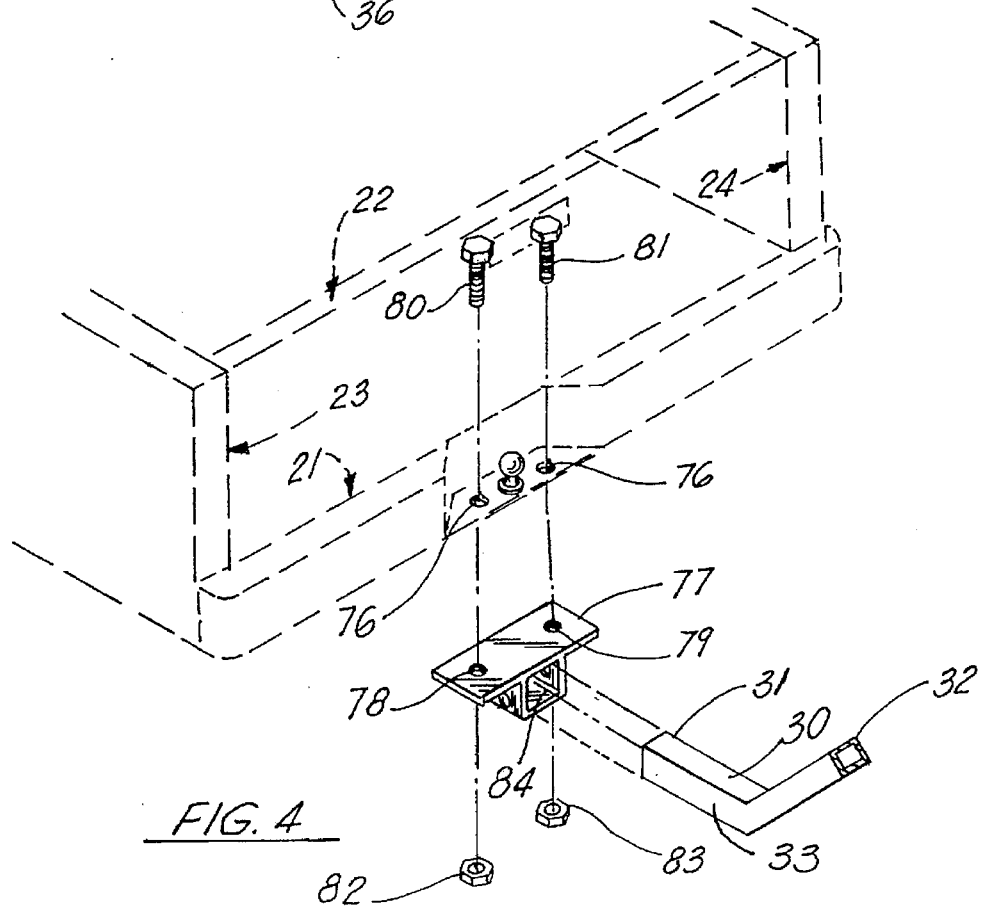
FIG. 4 is another fragmentary view of the preferred embodiment of the apparatus of the present invention illustrating connection to a truck bumper.

In FIG. 4, an alternate embodiment for attaching the beam 30 to pickup truck 11 as illustrated. In FIG. 4, the typical openings 76 found on pickup truck bumpers are used to bolt a receiver 77 to the bumper as shown. Openings 76 are aligned with respective openings 78, 79 of receiver 77. The receiver 77 is simply bolted to the pickup truck 11 at openings 76 using the bolts 80, 81 and nuts 82, 83. This places the receiver 77 and its socket 84 in a position below the pickup truck bumper so that it can receive beam 30 and form a connection therewith.

Figure 5:
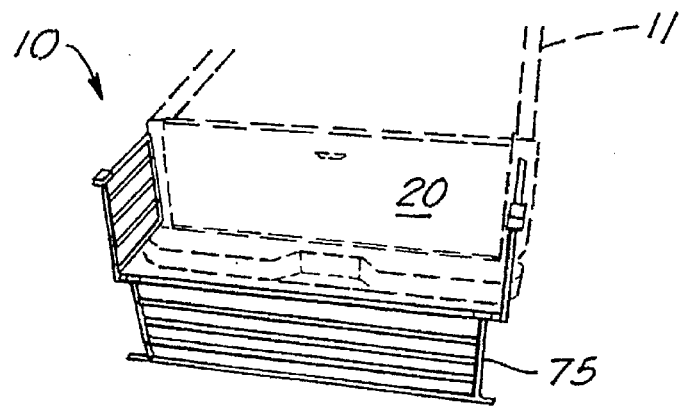
FIG. 5 is a perspective view of the preferred embodiment of the apparatus of the present invention illustrating the pickup truck tailgate in closed position and the truck bed extension apparatus 10 with its auxiliary tailgate in an open position.
Figure 6:
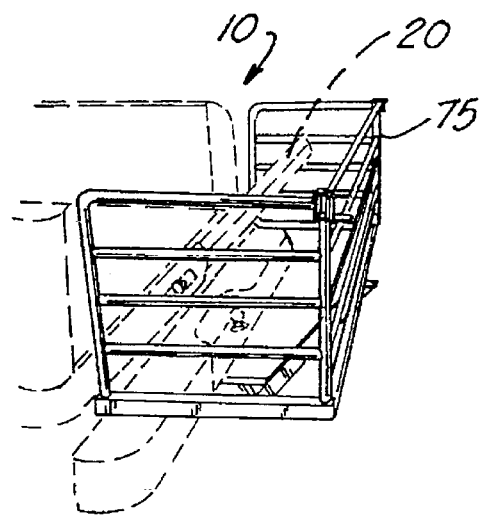
FIG. 6 is a perspective view of the preferred embodiment of the apparatus of the present invention illustrating the pickup truck tailgate being lowered between closed and opened positions and the truck bed extension with its auxiliary tailgate in a closed position.
Figure 7:
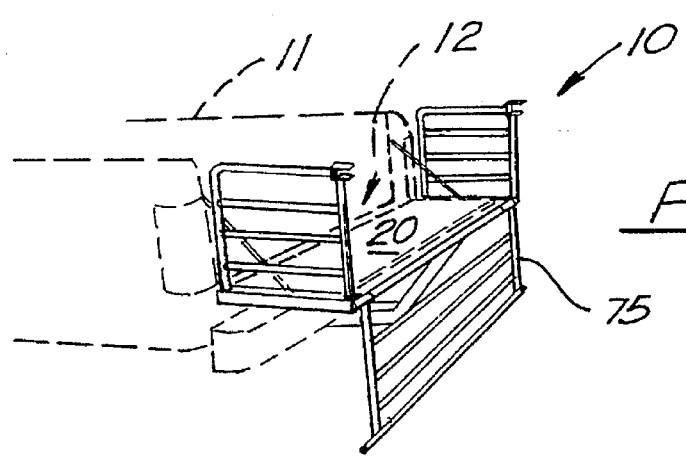
FIG. 7 is a perspective view of the preferred embodiment of the apparatus of the present invention showing the pickup truck tailgate in an open position and the auxiliary tailgate of the truck bed extension in the open position.

In FIGS. 5–7, the apparatus 10 of the present invention is shown in various positions that occur during use. In FIG. 5, truck 11 is shown having its tailgate 20 in a raised or closed position. Extension 10 is shown with its auxiliary tailgate 75 in a lowered position. In FIG. 1, the auxiliary tailgate preferably pivots through an arc of at least 90°. In FIG. 7, the auxiliary tailgate pivots through an arc of at least 180°.

In FIG. 6, the auxiliary tailgate 75 is shown in an uppermost or closed position. The pickup truck tailgate 20 is shown being lowered, and positioned about half way in between a closed and opened position.

In FIG. 7, the auxiliary tailgate 75 is shown in lowered position. The pickup truck tailgate 20 is shown lowered where it forms an extension of the truck bed 12.

The following table lists the parts numbers and parts descriptions as used herein and in the drawings attached hereto.

| PARTS LIST | |
| --- | --- |
| Part Number | Description |
| 10 | extension apparatus |
| 11 | truck |
| 12 | truck bed |
| 13 | rectangular side wall |

-continued

PARTS LIST

| Part Number | Description |
| --- | --- |
| 14 | rectangular side wall |
| 15 | rectangular flat bed |
| 16 | upper surface |
| 17 | upper surface |
| 18 | vertical edge portion |
| 19 | vertical edge portion |
| 20 | tailgate |
| 21 | lower edge |
| 22 | upper edge |
| 23 | side edge |
| 24 | side edge |
| 25 | flat surface |
| 26 | plane of bed |
| 27 | plane of upper surfaces |
| 28 | extended dimension |
| 29 | bed width |
| 30 | longitudinal beam |
| 31 | proximal end |
| 32 | distal end |
| 33 | horizontal section |
| 34 | inclined section |
| 35 | socket |
| 36 | pin |
| 36A | retainer clip |
| 37 | receiver |
| 38 | opening |
| 39 | opening |
| 40 | transverse beam |
| 41 | left end portion |
| 42 | right end portion |
| 43 | outer surface |
| 44 | bushing |
| 45 | bushing |
| 46 | reduced diameter portion |
| 47 | vertical beam |
| 48 | vertical beam |
| 49 | horizontal member |
| 50 | horizonal member |
| 51 | horizontal member |
| 52 | horizonal member |
| 53 | locking end |
| 54 | locking end |
| 55 | receptacle |
| 56 | receptacle |
| 57 | side wall |
| 58 | side wall |
| 59 | longitudinal beam |
| 60 | longitudinal beam |
| 61 | vertical post |
| 62 | vertical post |
| 63 | horizontal member |
| 64 | horizontal member |
| 65 | horizontal member |
| 66 | horizontal member |
| 67 | vertical post |
| 68 | vertical post |
| 69 | horizontal member |
| 70 | locking pins |
| 71 | locking pins |
| 72 | open space |
| 73 | lowered position |
| 74 | arrow |
| 75 | auxiliary tailgate |
| 76 | opening |
| 77 | receiver |
| 78 | opening |
| 79 | opening |
| 80 | bolt |
| 81 | bolt |
| 82 | nut |
| 83 | nut |
| 84 | receiver socket |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A trailer hitch and extension apparatus for extending a bed of a pickup truck having a width and that includes bed side walls with upper edges that define an upper plane and a horizontal surface between the bed walls that defines a lower plane, wherein the pickup truck has a bumper and a pivoting truck tailgate above the bumper that is movable between lowered, open and raised, closed positions, said apparatus comprising:

a) a truck frame portion that includes a structural member for attaching a trailer hitch thereto;

b) a longitudinal beam that extends away from the bumper and the truck bed in an operating position, the beam having proximal and distal end portions;

c) a removable connector for securing the proximal end portion of the longitudinal beam to the structural member of the truck frame in an operating position;

d) a transverse beam attached to the distal end portion of the longitudinal beam and extending about the width of the pickup truck bed; and e) left and right side wall extension members mounted respectively on opposite ends of the transverse beam, each side wall extension member being generally rectangular, having front and rear vertical edges and a lower edge that conforms to the lower plane of the truck bed horizontal surface and the tailgate when the tailgate is in the lowered position, and an upper edge that is adjacent the upper plane;

f) the side wall extension members and the transverse beam surrounding an open space above the longitudinal beam that receives the truck tailgate in the lowered position and enables the truck tailgate to be raised or lowered;

g) wherein the side wall extension members, the longitudinal beam, and the transverse beam form an extension frame during use that pivotally supports an auxiliary tailgate that pivots about a transverse line, said auxiliary tailgate being movable between open and closed positions, wherein in the closed position thereof the auxiliary tailgate is vertically oriented and abuts each of the rear vertical edges of said side wall extension members.

2. The trailer hitch and extension apparatus of claim 1 wherein the structural member of the truck frame includes a receiver socket, and the longitudinal beam has a projecting portion that fits into the receiver socket.

3. The trailer hitch and extension apparatus of claim 1 wherein the longitudinal beam comprises in part a horizontal beam portion.

4. The trailer hitch and extension apparatus of claim 1 wherein the longitudinal beam comprises a horizontal beam portion and an inclined beam portion connected to the horizontal beam portion.

5. An apparatus for extending a pickup truck bed of a pickup truck that includes bed side walls with upper edges that define an upper plane and a horizontal bed surface with a width positioned between the bed walls that defines a lower plane, wherein the pickup truck has a frame that includes a bumper, a trailer hitch receiver socket mounted on the frame, and a pivoting truck tailgate mounted above the bumper that is movable between lowered, open and raised, closed positions, said apparatus comprising:

a) a longitudinal beam that extends away from the frame at the bumper and the horizontal truck bed surface, the beam having proximal and distal end portions;

b) the longitudinal beam including a removable connector for securing the proximal end portion of the longitudinal beam to the trailer hitch receiver socket in an operating position;

c) a transverse beam attached to the distal end portion of the longitudinal beam and extending about the width of the horizontal bed surface; and d) left and right side wall extension members mounted respectively on opposite ends of the transverse beam, each side wall extension member being generally rectangular, having front and rear vertical edges and a lower edge that conforms to the lower plane and the tailgate when the tailgate is in the lowered position, and an upper edge that is adjacent the upper plane;

e) the side wall extension members and the transverse beam surrounding an open space above the longitudinal beam that enables the tailgate to be raised or lowered;

f) wherein the side wall extension members, the longitudinal beam, and the transverse beam form an extension frame during use that pivotally supports an auxiliary tailgate that pivots about a transverse line, said auxiliary tailgate being movable between an opened position and a closed position, wherein the auxiliary tailgate is vertically oriented and abuts each rear vertical edge of said side wall extension members when said auxiliary tailgate is in said closed position thereof.

6. The apparatus of claim 5 wherein the longitudinal beam has a projecting portion that fits into the receiver socket.

7. The apparatus of claim 5 wherein the longitudinal beam comprises a horizontal beam portion and an inclined beam portion connected to the horizontal beam portion.

8. The apparatus of claim 5 wherein the side wall extension members are each comprised of a plurality of horizontal members and vertical members.

9. The apparatus of claim 5 wherein the longitudinal beam, the transverse beam, and the sidewall extension members are of a welded metallic construction.

* * * * *